United States Patent
Lortz et al.

(10) Patent No.: US 7,834,076 B2
(45) Date of Patent: Nov. 16, 2010

(54) ALUMINIUM OXIDE-CONTAINING DISPERSION

(75) Inventors: Wolfgang Lortz, Waechtersbach (DE);
Gabriele Perlet, Grosskrotzenburg (DE);
Werner Will, Gelnhausen (DE); Sascha Reitz, Hanau (DE)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 12/159,998

(22) PCT Filed: Jan. 26, 2007

(86) PCT No.: PCT/EP2007/050779
§ 371 (c)(1),
(2), (4) Date: Jul. 3, 2008

(87) PCT Pub. No.: WO2007/096226
PCT Pub. Date: Aug. 30, 2007

(65) Prior Publication Data
US 2009/0111919 A1     Apr. 30, 2009

(30) Foreign Application Priority Data
Feb. 21, 2006    (DE) .................. 10 2006 007 888

(51) Int. Cl.
*C08K 5/49*      (2006.01)
*C08K 3/14*      (2006.01)
*C08K 9/00*      (2006.01)
*C08K 9/02*      (2006.01)

(52) U.S. Cl. .................. 524/437; 524/115; 523/200; 523/204; 423/299; 423/600

(58) Field of Classification Search ............ 252/182.11; 216/88; 423/10, 242.3, 299, 600; 524/115, 524/126, 437; 523/200, 204, 334; 428/403, 428/404, 448, 406, 472.2
See application file for complete search history.

(56) References Cited

U.S. PATENT DOCUMENTS

| | | | |
|---|---|---|---|
| 7,431,993 B2 * | 10/2008 | Darsillo et al. | 428/451 |
| 2005/0224749 A1 * | 10/2005 | Lortz et al. | 252/182.11 |
| 2007/0098990 A1 * | 5/2007 | Cook et al. | 428/404 |
| 2007/0149097 A1 * | 6/2007 | Fujii et al. | 451/41 |

FOREIGN PATENT DOCUMENTS

| | | |
|---|---|---|
| DE | 199 52 383 | 5/2001 |
| JP | 2005-023313 A | 1/2005 |
| WO | 03 020839 | 3/2003 |
| WO | 2004 096941 | 11/2004 |
| WO | WO 2004/111145 A1 | 12/2004 |

* cited by examiner

*Primary Examiner*—Vasu Jagannathan
*Assistant Examiner*—Hannah Pak
(74) *Attorney, Agent, or Firm*—Oblon, Spivak, McClelland, Maier & Neustadt, L.L.P.

(57) ABSTRACT

A dispersion containing aluminum oxide of pyrogenic origin and water, where the aluminum oxide is present in the form of aggregated primary particles with a BET surface area of 20 to 200 $m^2/g$ and has a mean, volume-based aggregate diameter in the dispersion of less than 100 nm, and is surface-modified with (i) organophosphonic acids, or salts thereof, and (ii) at least one hydroxycarboxylic acids or salts thereof.

17 Claims, 1 Drawing Sheet

ALUMINIUM OXIDE-CONTAINING DISPERSION

CROSS-REFERENCE TO RELATED APPLICATIONS

The present application is a National Stage (371) of PCT/EP07/50779, filed Jan. 26, 2007, which claims priority to DE 102006007888.8, filed on Feb. 21, 2006.

FIELD OF THE INVENTION

The invention relates to an aluminium oxide-containing dispersion and a process for the production thereof.

The invention further relates to a melamine resin-containing preparation containing this dispersion and a process for the production thereof.

The invention further relates to a product hardened by means of the preparation.

BACKGROUND OF THE INVENTION

The imparting of a decorative appearance to surfaces of furniture or floors and the reduction of their sensitivity to mechanical, thermal and chemical stress through application of laminates is known. Here, for example the reduction of sensitivity to scratches and stains may be mentioned. The laminate should moreover be as transparent as possible.

Laminates often consist of one or several paper layers which are impregnated with a thermally curing synthetic resin. Also, hard substances are often incorporated in the top paper layer in an attempt to further increase the scratch and abrasion resistance of laminates. For this, aluminium oxide has proved to be a particularly suitable hard substance.

In WO 01/53387, the production of curable coatings with a macroscopic texture, starting from a coating mixture which contains an irradiation curing resin, an initiator and a rheology adjuster, such as for example nanoscale aluminium oxide particles, is disclosed. For this, the aluminium oxide particles are incorporated into the coating mixture in the form of a powder at a concentration of 1 to 40 wt. %. Further, a coupling agent can be added to the coating mixture, for the purpose of improving the distribution of the aluminium oxide particles in the coating mixture and ensuring good bonding in the cured coating. Homogeneous distribution of the particles in the coating mixture is a problem when this contains high concentrations of particles. However, for high mechanical stability of the cured coating, as high a concentration of aluminium oxide particles as possible is desirable. Furthermore, the viscosity rises with the concentration of the aluminium oxide particles in the coating mixture. In WO 01/53387, aluminium oxide concentrations up to 40 wt. % in the coating mixture are admittedly disclosed, however, at such high concentrations, the coating mixture is now almost impossible to process.

EP-A-1252239 discloses the use of powders and dispersions of aluminium oxide for the production of laminates. A disadvantage in the aluminium oxide products disclosed is the low content thereof, for example 15 wt. % in Example 2, in melamine-containing preparations and hence in the laminate, as a result of which the mechanical properties of the laminate can only be improved to an inadequate extent. A further disadvantage is that, with the requirement for high transparency, water-based dispersions yield less good results than dispersions based on an organic solvent. However, high solvent concentrations are not desirable for environmental compatibility and plant safety reasons.

SUMMARY OF THE INVENTION

The purpose of the invention consists in the provision of an aluminium oxide-containing preparation which makes it possible to improve the mechanical properties of a melamine-based laminate relative to the state of the technology. In particular, the processing properties of the preparation at high solids concentration should be good.

A further purpose of the invention consists in the provision of the aluminium oxide in a stable, readily processable form with a high content.

DETAILED DESCRIPTION OF THE INVENTION

Figure 1:
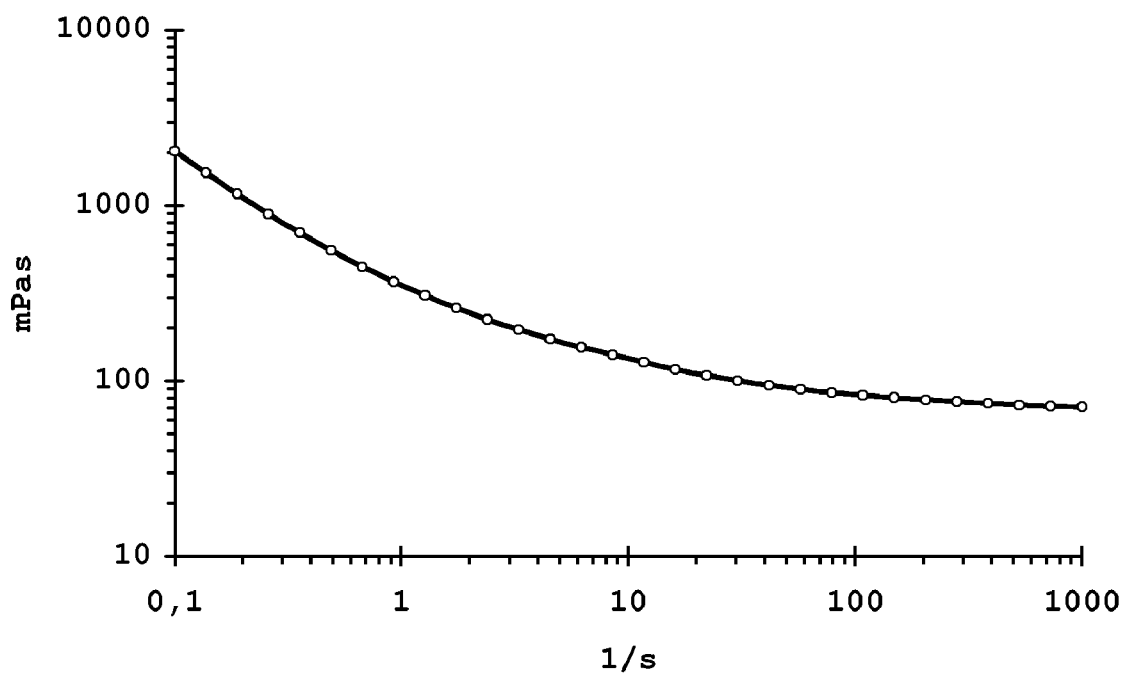
FIG. 1 shows the dependence of the viscosity of a hard substance-free dispersion from Example 1 against the shear rate. A higher viscosity at lower shear rates is clearly discerned. This higher viscosity decreases the tendency to sedimentation of the heavy hard substance particles. On further processing of the hard substance-containing dispersion at higher shear rates, this displays a markedly lower viscosity, which has a favourable effect on the processability.

The object of the invention is a dispersion containing aluminium oxide and water, wherein the aluminium oxide
 is present in the form of aggregated primary particles with a BET surface area of 20 to 200 $m^2/g$, preferably of 50 to 150 $m^2/g$, and has a mean, volume-based, aggregate diameter in the dispersion of less than 100 nm, preferably 40 to 90 nm,
 is surface-modified with organophosphonic acids and/or salts thereof, where
   the surface can be completely or partially modified and the organophosphonic acids bear at least one amino and/or hydroxy group and
 is present at a content of 20 to 70 wt. %, preferably 30 to 60 wt. %, based on the total quantity of the dispersion.

Preferably, the dispersion according to the invention can contain an aluminium oxide of pyrogenic origin. Here, pyrogenic should be understood to mean that these aluminium oxide powders are obtained by conversion of a suitable starting material in a flame.

Pyrogenic processes include flame oxidation and flame hydrolysis. For the large-scale industrial production of aluminium oxide, the flame hydrolysis of aluminium chloride in a hydrogen/oxygen flame is mainly used.

As a rule, the aluminium oxide particles produced in this way are present in the form of aggregated primary particles, wherein the primary particles are free from pores and bear hydroxy groups on their surface. Furthermore, the aluminium oxide thus produced has as its main component the gamma, delta or theta modifications or mixtures of the aforesaid. The alpha modification is not observed with pyrogenic processes.

During the conversion of aluminium chloride to aluminium oxide, hydrochloric acid is formed as a by-product, and adheres to the aluminium oxide particles. Usually, the major part of the hydrochloric acid is removed from the particles by a treatment with steam. In a 4 percent dispersion in water, an aluminium oxide powder as a rule displays a pH value of 3 to 5.

Possible suitable aluminium oxide powders are: AEROXIDE® Alu C, AEROXIDE® Alu 65 and AEROXIDE® Alu 130, all Degussa AG, and SpectrAl™ 100 Fumed Alumina, SpectrAl™ 51 Fumed Alumina and SpectrAl™ 81 Fumed Alumina, all Cabot Corp.

Suitable organophosphonic acids can be monohydroxyphosphonic acids, dihydroxyphosphic acids, polyhydroxyphosphonic acids, monoaminophosphonic acids, diaminophosphonic acids, polyaminophosphonic acids, hydroxyaminophosphonic acids and/or salts thereof.

In particular, the dispersion according to the invention can contain organophosphonic acids according to the general formula:

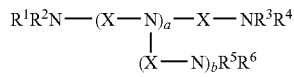

with
$R^1$, $R^2$, $R^3$, $R^4$, $R^5$, $R^6$ each mutually independently =H or $CH_2$—$PO(OH)_2$,
X=$C_1$-$C_{10}$ alkyl residue (linear or branched), and
a and b each mutually independently 0-2500.

Examples of preferred organophosphonic acids with this structure are ethylenediaminetetramethylenephosphonic acid, diethylenetriaminepentamethylenephosphonic acid, hydroxyethylethylenediaminetrimethylenephosphonic acid, pentaethylenehexamineoctamethylenephosphonic acid, hexamethylenediaminetetramethylenephosphonic acid, diethylenetriaminemonocarboxymethyltetramethylenephosphonic acid and/or salts thereof.

Furthermore, the organophosphonic acids present in the dispersion according to the invention can have a structure according to the general formula:

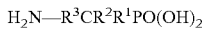

with
$R^1$=alkyl group with 1 to 4 C atoms, aryl group with 6 to 10 C atoms or —$PO(OH)_2$,
$R^2$=alkyl group with 1 to 4 C atoms or aryl group with 6 to 10 C atoms
$R^3$=alkylene group with 1 to 6 C atoms or
$R^1$ and $R^3$ together with the C atom to which they are bound form an aromatic ring, $R^2$ being absent in this case.

Examples of preferred organophosphonic acids with this structure are 2-amino-1-phenethylphosphonic acid, 1-aminoethanedisphosphonic acid, 1-aminopropanedisphosphonic acid and aminophenylmethylenediphosphonic acid.

Further, the dispersion according to the invention can contain organophosphonic acids from the group comprising $HOCH_2$—$CH(OH)PO(OH)_2$, $(HO)_2OP$—$CH(OH)$—$PO(OH)_2$, $(HO)_2OP$—$CH_2$—$CH_2$—$CH(OH)PO(OH)_2$ and/or $HO_2C$—$CR(OH)PO(OH)_2$ with R=Me, Et, Pr or Bu.

Further, hydroxyethylaminodi (methylenephosphonic acid), $HOCH_2N[(CH_2PO(OH)_2)]_2$ can be a component of the dispersion according to the invention.

The content of the organophosphonic acid in the dispersion according to the invention is not limited. As a rule, the content of organophosphonic acids will be adapted to the content of aluminium oxide and the BET surface area thereof. Hence in a preferred embodiment, the dispersion according to the invention has a content of organophosphonic acid or salts thereof from 0.2 to 7.5 µmol/m² aluminium oxide surface area, and particularly preferably 0.5 to 2.5 µmol/m² aluminium oxide surface area.

The dispersion according to the invention can further contain one or several compounds having silanol groups or form these through hydrolysis in the aqueous dispersion.

These include in particular:

organosilanes of the type $(RO)_3Si(CH_2)_m$—R' with R=$C_1$-$C_4$-alkyl, m=1-20 and R'=—$NH_2$ or $NH(CH_2)_mNH_2$, for example
$H_2N(CH_2)_3Si(OMe)_4$, $H_2N(CH_2)_3Si(OEt)_4$ or $H_2N(CH_2)_2HN(CH_2)_3Si(OMe)_4$,
organosilanes of the type $(RO)_3Si(CH_2)_m$—$NH_2$
R=alkyl, such as methyl, ethyl or propyl
m=1-20
organosilanes of the type $R_x(RO)_ySi(CH_2)_m$—$NH_2$ with R=Alkyl, x+y=2, x=1, 2, y=1, 2,
Polysiloxanes or silicone oils of the type:

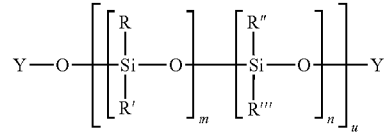

with
R=alkyl, aryl or $(CH_2)_n$—$NH_2$, H
R'=alkyl, aryl or $(CH_2)_n$—$NH_2$, H
R''=alkyl, aryl or $(CH_2)_n$—$NH_2$, H
R'''=alkyl, aryl or $(CH_2)$—$NH_2$, H
Y=$CH_3$, H, $C_zH_{2z+1}$ with z=1-20,
$Si(CH_3)_3$, $Si(CH_3)_2H$, $Si(CH_3)_2OH$, $Si(CH_3)_2(OCH_3)$ or
$Si(CH_3)_2(C_zH_{2z+1})$
wherein
R' or R'' or R''' is $(CH_2)_z$—$NH_2$ and
z=1-20,
m=0, 1, 2, 3, . . . ∞,
n=0, 1, 2, 3, . . . ∞,
u=0, 1, 2, 3, . . . ∞.

Further, hydrolysates, such as Dynasylan® HYDROSIL 1151, an aqueous 3-aminopropylsilane hydrolysate or Dynasylan® Hydrosil 2627, an aqueous amino/alkyl-silane hydrolysate (amino-functionalised oligomeric siloxane) can also be used.

Preferably, the content of compounds having silanol groups is 0.2 to 5 µmol/m² aluminium oxide surface area.

As a further component, the dispersion according to the invention can contain at least one hydroxycarboxylic acid and/or salts thereof, citric acid and tartaric acid being particularly preferred.

Preferably, the content of hydroxycarboxylic acids and/or salts thereof is 0.1 to 5.5 µmol/m² aluminium oxide surface area.

It has moreover been found advantageous if the pH value of the dispersion according to the invention lies in a range from 7 to 10. In this range, the dispersion according to the invention displays a particularly low viscosity and very high stability. Since a similar pH value is as a rule established for the storage of melamine resin solutions, no adverse effects, such as for example precipitates, are observed on combination of this solution with the dispersion according to the invention. Acids or bases can be used for the regulation of the pH value. With the dispersions according to the invention, the adjustment to the aforesaid pH range is as a rule effected with caustic soda solution, caustic potash solution, ammonia water or tetraalkylammonium hydroxides.

Particularly preferred is a dispersion according to the invention, which
as well as aluminium oxide and water, contains
at least one organophosphonic acid with at least one free amino group and at least one hydroxycarboxylic acid, in particular citric acid.

Also particularly preferred is a dispersion according to the invention, which contains 30 to 60 wt. % of pyrogenically produced aluminium oxide with a BET surface area of 50 to 150 m$^2$/g and a volume-based aggregate diameter of the aluminium oxide particles in the dispersion of 40 to 90 nm, at least one organophosphonic acid with at least one free amino group with a content of 0.2 to 7.5 µmol/m$^2$ aluminium oxide surface area, and at least one hydroxycarboxylic acid, in particular citric acid with a content of 0.1 to 5.5 µmol/m$^2$ aluminium oxide surface area, and the rest water.

Also particularly preferred is a dispersion according to the invention with a pH value of 7 to 10, which contains 30 to 60 wt. % of pyrogenically produced aluminium oxide with a BET surface area of 50 to 150 m$^2$/g and a volume-based aggregate diameter of the aluminium oxide particles in the dispersion of 40 to 90 nm, at least one organophosphonic acid with at least one free amino group with a content of 0.2 to 7.5 µmol/m$^2$ aluminium oxide surface area, and at least one hydroxycarboxylic acid, in particular citric acid with a content of 0.1 to 5.5 µmol/m$^2$ aluminium oxide surface area, and the rest water.

Also particularly preferred is a dispersion according to the invention, which as well as aluminium oxide and water, contains at least one organophosphonic acid with at least one free amino group, at least one aminosilane and at least one hydroxycarboxylic acid, in particular citric acid.

Also particularly preferred is a dispersion according to the invention, which contains 30 to 60 wt. % of pyrogenically produced aluminium oxide with a BET surface area of 50 to 150 m$^2$/g and a volume-based aggregate diameter of the aluminium oxide particles in the dispersion of 40 to 90 nm, at least one organophosphonic acid with at least one free amino group with a content of 0.2 to 7.5 µmol/m$^2$ aluminium oxide surface area, at least one aminosilane with a content of 0.2 to 5 µmol/m$^2$ aluminium oxide surface area and at least one hydroxycarboxylic acid, in particular citric acid with a content of 0.1 to 5.5 µmol/m$^2$ aluminium oxide surface area, and the rest water.

Also particularly preferred is a dispersion according to the invention with a pH value of 7 to 10, which contains:

30 to 60 wt. % of pyrogenically produced aluminium oxide with a BET surface area of 50 to 150 m$^2$/g and a volume-based aggregate diameter of the aluminium oxide particle in the dispersion of 40 to 90 nm, at least one organophosphonic acid with at least one free amino group with a content of 0.2 to 7.5 µmol/m$^2$ aluminium oxide surface area, at least one aminosilane with a content of 0.2 to 5 µmol/m$^2$ aluminium oxide surface area and at least one hydroxycarboxylic acid, in particular citric acid with a content of 0.1 to 5.5 µmol/m$^2$ aluminium oxide surface area, and the rest water.

The dispersion according to the invention can moreover contain hard substances. Hard substances should be understood to mean substances which have a Mohs hardness of at least 6 and have a mean particle diameter which is greater than that of the aluminium oxide particles in the dispersion. The mean particle diameter of the hard substances is as a rule 1 to 100 µm. As hard substances, for example, corundum, fused corundum, emery, spinel and carbides can be mentioned.

The content of the hard substances can be 5 to 50 wt %, based on the total quantity of the dispersion.

Also particularly preferred is a dispersion according to the invention with a pH value of 7 to 10, which contains 30 to 60 wt. % of pyrogenically produced aluminium oxide with a BET surface area of 50 to 150 m$^2$/g and a volume-based aggregate diameter of the aluminium oxide particles in the dispersion of 40 to 90 nm, 10 to 40 wt. % of a hard substance, at least one organophosphonic acid with at least one free amino group with a content of 0.2 to 7.5 µmol/m$^2$ aluminium oxide surface area, at least one aminosilane with a content of 0.2 to 5 µmol/m$^2$ aluminium oxide surface area und at least one hydroxycarboxylic acid, in particular citric acid with a content of 0.1 to 5.5 µmol/m$^2$ aluminium oxide surface area, and the rest water.

A dispersion according to the invention which contains hard substances is distinguished by excellent stability against sedimentation with in addition good processability. This is possibly attributable to the rheological properties of a dispersion according to the invention without hard substances. FIG. 1 shows the dependence of the viscosity of a hard substance-free dispersion from Example 1 against the shear rate. A higher viscosity at lower shear rates is clearly discerned. This higher viscosity decreases the tendency to sedimentation of the heavy hard substance particles. On further processing of the hard substance-containing dispersion at higher shear rates, this displays a markedly lower viscosity, which has a favourable effect on the processability.

Within the meaning of the invention, organophosphonic acids, compounds having silanol groups and hydroxy-carboxylic acids should be understood to mean compounds which are soluble, or in the case of silanes temporarily soluble after hydrolysis, in the liquid dispersion phase.

A further object of the invention is a process for the production of the dispersion according to the invention, wherein one or several organophosphonic acids and/or salts thereof, optionally one or several compounds having silanol groups or compounds forming these by hydrolysis in the aqueous dispersion, optionally one or several hydroxycarboxylic acids and/or salts thereof are first placed in water, aluminium oxide is added all at once, in portions or continuously, and dispersed by an energy input of more than 1000 KJ/m3 and then optionally one or several substances acting as bases are added, until a pH value of 7 to 10 is established and optionally hard substances are added with stirring.

Suitable possible dispersion units are: planetary kneaders, rotor-stator machines, stirred ball-mills, cylinder mill or a high energy milling, wherein part streams are placed under a pressure of at least 500 bar in a high energy mill, released through a nozzle and allowed to impinge on one another in a gas or liquid filled reaction space, and the high energy milling is optionally repeated once or several times.

A further object of the invention is a preparation which contains the dispersion according to the invention and one or several melamine resins. Melamine resins here include the unmodified and modified melamine resins known to the skilled person. Examples thereof are described in Ullmann's Encyclopaedia of Industrial Chemistry, Vol. A2, 5th Edition, in the chapter "Amino Resins", pages 115 to 141. The preparation according to the invention advantageously contains 25 to 75 wt. % of melamine resin, based on the total quantity of the preparation.

Further, it is advantageous if the weight ratio (aluminium oxide+ureas)/melamine resin is 1:10 to 3:1.

A further object of the invention is a process for the production of the preparation according to the invention, wherein the dispersion according to the invention is added with stirring to an aqueous solution of a melamine resin. The order of addition can also be reversed, that is the aqueous solution of a melamine resin can also be added to the dispersion.

A further object of the invention is a cured product which is obtainable by application of a mixture of the preparation according to the invention and optionally an acid or a compound forming acid on heat treatment onto a substrate, removal of the water, and subsequent curing by heat treatment.

Suitable acids or acid-forming compounds can be aliphatic sulphonic acids, aliphatic sulphonates, aliphatic carboxylic acids, aliphatic carboxylates, aromatic carboxylic acids, aromatic carboxylates, alkylbenzene-sulphonic acids and/or alkylbenzene sulphonates. The quantity of acids or acid-forming compounds is preferably 0.1 to 10 wt. %, based on the quantity of aluminium oxide plus melamine resin plus acids or acid-forming compounds.

The removal of the water is preferably effected at 20 to 100° C., and the heat treatment at 120 to 200° C. over a period of 10 secs to 24 hours.

A further object of the invention is the use of the dispersion according to the invention or the preparation according to the invention or the cured product according to the invention for the production of a laminate

EXAMPLES

Analytical Procedures

The viscosity is determined with an MCR300 instrument with CC27 measurement system, Parr-Physica Co., the measurements being made at shear rates of 0.01 to 1000 sec$^{-1}$ and 23° C. The viscosity values at 10 sec$^{-1}$ and 100 sec$^{-1}$ are stated.

The zeta potential and the isoelectric point is determined with an instrument of the DT-1200 type from the company Dispersion Technology Inc., by the CVI procedure. The titration is effected with KOH/HNO$_3$. For the measurement, samples are diluted to 5 wt. % Al$_2$O$_3$.

The mean particle size d$_{50}$ of the aluminium oxide particles in the dispersion is determined by photon correlation spectroscopy. The Zetasizer 2000 HS instrument (Malvern Ltd., UK) is used. The volume-weighted median value from the peak analysis is stated.

The BET surface area is determined after DIN 66131.

Example 1 According to the Invention 36.6 kg of deionised water, 2.25 kg of Cublen R 60 (corresponding to 1.2 μmol/m$^2$ aluminium oxide surface area), 0.875 kg of citric acid monohydrate (corresponding to 0.9 μmol/m$^2$ aluminium oxide surface area) and 2.25 kg of 25 percent caustic soda solution are first placed in a 100 l stainless steel batch vessel. Next, by means of the suction tube of the Ystral Conti-TDS 3 (stator grooves: 4 mm ring and 1 mm ring, rotor/stator gap ca. 1 mm), 45 kg of AEROXIDE® Alu C (pyrogenically produced aluminium oxide, BET 100 m$^2$/g, main component theta and delta aluminium oxide; Degussa AG) are inducted under shear conditions. After completion of the addition of the Al$_2$O$_3$, the induction nozzle is closed and the mixture sheared at 3000 rpm for a further 15 mins. Finally, the predispersion is adjusted to an Al$_2$O$_3$ content of 50 wt.-% and a pH value of 8.0 with 0.38 kg of 25 percent caustic soda solution and 2.64 kg of deionised water and again sheared for ca. 5 mins more for homogenisation. This predispersion passed in two passages through the Sugino Ultimaizer HJP-25050 high energy mill with a pressure of 2500 bar and diamond nozzles of 0.3 mm diameter and is thus further intensively milled.

The mean aggregate diameter is 52 nm (determined with the Zetasizer 2000 HS, Malvern). The zeta potential of the dispersion is −34 mV with a conductivity of 0.18 S/m. The viscosity is 82 mPas (at 100 1/sec, 23° C., using Physica MCR 300). Even after 6 months, the dispersion shows no signs of gelling or of sedimentation.

Example 2

By means of a magnetic stirrer, 600 g of melamine resin Madurit® MW 550 powder from INEOS Melamines GmbH are incorporated into 266.7 g of deionised water at 50° C. By means of a dissolver (1200 rpm) 780 g of the melamine resin solution cooled to room temperature are incorporated within 15 mins into 720 g of the dispersion from Example 1. The preparation has a solids concentration of ca. 60 wt. %. After drying at 105° C., the preparation has an aluminium oxide content of 40 wt. % und a melamine resin content of 60 wt. %.

The undried preparation is of low viscosity (145 mPas at 100 sec$^{-1}$ and 23° C., after 24 hours). For at least 1 week it is suitable for processing.

The invention claimed is:

1. A dispersion containing aluminium oxide of pyrogenic origin and water, wherein the aluminium oxide
   is present in the form of aggregated primary particles with a BET surface area of 20 to 200 m$^2$/g and has a mean, volume-based aggregate diameter in the dispersion of less than 100 nm,
   is surface-modified with
   (i) organophosphonic acids or salts thereof, where
      the surface is completely or partially modified,
      the organophosphonic acids bear at least one amino and/or hydroxy group and is present in an amount ranging from 0.2 to 7.5 μmol/m$^2$ surface area of the aluminium oxide and
   (ii) at least one hydroxycarboxylic acids or salts thereof present in an amount ranging from 0.1 to 5.5 μmol/m$^2$ surface area of the aluminium oxide; the aluminium oxide is present in an amount ranging from 20 to 70 wt. %, based on the total weight of the dispersion.

2. The dispersion according to claim 1, wherein the BET surface area of the aluminium oxide particles is 50 to 150 m$^2$/g.

3. The dispersion according to claim 1, wherein the volume-based aggregate diameter of the aluminium oxide particles in the dispersion is 40 to 90 nm.

4. The dispersion according to claim 1, wherein the organophosphonic acids have a structure according to the general formula

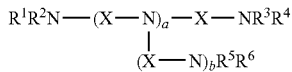

with

R¹, R², R³, R⁴, R⁵, R⁶ each mutually independently =H or $CH_2-PO(OH)_2$

X =$C_1$-$C_{10}$ alkyl residue (linear or branched), a and b each mutually independently 0-2500.

5. The dispersion according to claim 1, wherein the organophosphonic acids have a structure according to the general formula

with

R¹ =alkyl group with 1 to 4 C atoms, aryl group with 6 to 10 C atoms or —$PO(OH)_2$, R² =alkyl group with 1 to 4 C atoms or aryl group with 6 to 10 C atoms R³ =alkylene group with 1 to 6 C atoms or R¹ and R³ together with the C atom to which they are bound form an aromatic ring, R² being absent in this case.

6. The dispersion according to claim 1, wherein the organophosphonic acids is at least one organophosphonic acid selected from the group consisting of $HOCH_2-CH(OH)PO(OH)_2$, $(HO)_2OP-CH(OH)-PO(OH)_2$, $(HO)_2OP-CH_2-CH_2-CH(OH)PO(OH)_2$ and $HO_2C-CR(OH)PO(OH)_2$ with R=Me, Et, Pr, or Bu.

7. The dispersion according to claim 1, wherein said dispersion contains one or several compounds having silanol groups or forms these by hydrolysis in the aqueous dispersion.

8. The dispersion according to claim 7, wherein the content of compounds having silanol groups is 0.2 to 5 μmol/m² surface area of the aluminium oxide.

9. The dispersion according to claim 1, wherein the pH value of said dispersion is 7 to 10.

10. The dispersion according to claim 1, wherein said dispersion further comprises one or more hard substances.

11. A process for the production of the dispersion according to claim 1, comprising placing in water
 one or more organophosphonic acids or salts thereof,
 one or more hydroxycarboxylic acids or salts thereof,
optionally one or more compounds having silanol groups or compounds forming these by hydrolysis in the aqueous dispersion, and
adding aluminum oxide all at once, in portions or continuously,
dispersing the resultant mixture by an energy input of more than 1000 KJ/m³ such that the aluminum oxide
is present in the form of aggregated primary particles with a BET surface area of 20 to 200 m²/g and has a mean, volume-based aggregate diameter in the dispersion of less than 100 nm,
is surface-modified with
 (i) organophosphonic acids or salts thereof, where the surface is completely or partially modified, the organophosphonic acids bear at least one amino and/or hydroxy group and is present in an amount ranging from 0.2 to 7.5 μmol/m² surface area of the aluminum oxide and
 (ii) at least one hydroxycarboxylic acids or salts thereof present in an amount ranging from 0.1 to 5.5 μmol/m² surface area of the aluminum oxide; and
optionally adding one or more substances with a basic action until a pH value of 7 to 10 is established and
optionally adding one or more hard substances with stirring.

12. A preparation comprising the dispersion according to claim 1 and at least one melamine resin.

13. The preparation according to claim 12, wherein the content of melamine resin in the preparation is 25 to 75 wt. %, based on the total quantity of the preparation.

14. The preparation according to claim 12, wherein the weight ratio (aluminium oxide+hard substances)/melamine resin is 1:10 to 3:1.

15. A process for the production of the preparation according to claim 12, comprising adding said dispersion with stirring to an aqueous solution of a melamine resin.

16. A cured product produced by applying a mixture of the preparation according to claim 12 and optionally an acid or a compound forming acid on heat treatment onto a substrate, removing water and subsequently curing by heat treatment.

17. A method for producing a laminate comprising applying the dispersion according to claim 1 to the surface of a substrate, removing water, and curing by heat treatment.

* * * * *